July 23, 1940.                R. D. TOUTON                2,208,740
                        AIR CONDITIONING APPARATUS
                           Filed Sept. 20, 1938
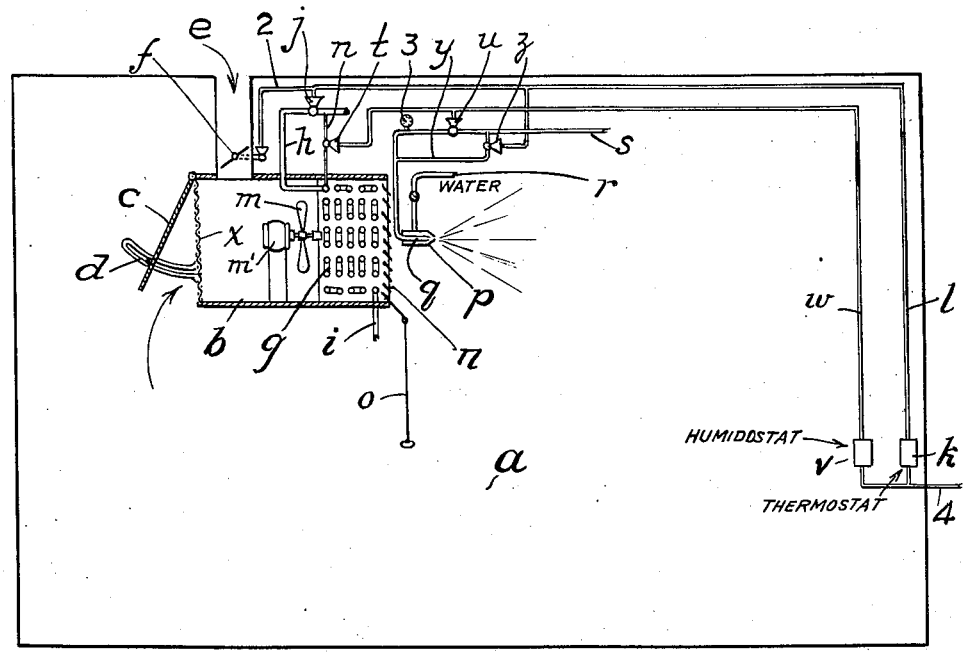
WITNESS:
INVENTOR
Rush D. Touton
BY
    ATTORNEYS.

Patented July 23, 1940

2,208,740

UNITED STATES PATENT OFFICE 2,208,740

AIR CONDITIONING APPARATUS

Rush D. Touton, Cynwyd, Pa., assignor to Wurton Machine Company, Philadelphia, Pa., a corporation of Pennsylvania Application September 20, 1938, Serial No. 230,763

2 Claims. (Cl. 261—14)

This invention relates to an improvement in apparatus for air conditioning and more particularly to such apparatus for maintaining desired uniform conditions of temperature and humidity throughout enclosed spaces of relatively large area, such as may be used for storage, the processing or manufacturing of materials, and the like.

The apparatus in accordance with this invention will be found to be of special advantage in connection with the maintenance of uniform conditions of temperature and humidity in enclosed areas used for the storage, processing or manufacturing, and the like, of materials which require the maintenance of uniform conditions of temperature and humidity and which are especially susceptible to changes in such conditions. Thus, by way of example, the apparatus in accordance with this invention will be found to be of special advantage for the maintenance of uniform conditions of temperature and humidity in enclosed areas in which tobacco is stored, processed or manufactured.

Heretofore for the purposes for which the apparatus in accordance with this invention, as have been indicated, is intended, it has been customary to supply conditioned air through ducts from a remotely located air conditioning apparatus and again to introduce heat directly into an enclosed area, as from a wall radiator, or other source of heat located within the area for the maintenance of temperature and to introduce water directly into the air within the area through the medium of a plurality of spray heads disposed within the area remote from the source of heat.

The procedure and instrumentalities heretofore used for the purposes accomplished by the apparatus according to this invention have, for various reasons, proved inefficient for the purposes intended and consequently unsatisfactory.

Thus, where it is attempted to maintain uniform conditions of temperature and humidity within an enclosed area by the introduction through ducts of conditioned air supplied by apparatus located remote from the area, non-uniform conditions of temperature and humidity occur within the area inasmuch as it is impossible by such means to obtain a uniform circulation within the area. Change in the condition of the air variously within the area results in non-uniformity in the condition of the air as a whole. Again, such means will not respond to changes in the condition of the air with sufficient rapidity to negative effects producing non-uniformity.

Where a source of heat is provided within the area and water is introduced into the area through the medium of a plurality of spray heads located remote from the source of heat, desired uniform conditions within the area are unobtainable and, indeed, with such means non-uniform conditions result. Thus, with such a system no provision is made for the introduction of fresh air. Circulation of air within the area depends upon difference in the condition of the air in different parts of the conditioning chamber. Local loss of heat through walls and the like, and local input of heat and moisture from workers, machine, materials stored or in process, etc. create localized areas in which the temperature drops unduly which results in condensation; and further areas in which the relative humidity drops due to local heat input.

Again, the introduction of water through a plurality of spray heads remote from the source of heat and the reductions in temperature occurring locally variously within the area, serves as a definite limitation upon the amount of water which may be evaporated into the air and, in the final analysis, with such means non-uniform rather than uniform conditions of temperature and humidity are obtained.

Now in accordance with this invention an apparatus is provided which is highly efficient for the maintenance of uniform conditions of temperature and humidity throughout enclosed areas adapted for the storage, processing, manufacturing of materials, and the like, requiring maintenance of uniform conditions and, more especially, materials susceptible to changes in conditions, such as tobacco.

In accordance with this invention procedure and apparatus are provided by which conditioned air is circulated uniformly within an enclosed area, the direction of circulation with respect to means for heating and humidifying being controlled with consideration for the conditions existing variously within the enclosed area and, further, so that in its circulation the air will pick up the maximum amount of heat available in the area from workers, machines, lights, etc. to the end such heat may be utilized for evaporating moisture for the maintenance of uniform humidity. Again, in accordance with this invention, fresh air may be supplied for circulation and the supply of heat and moisture to the air will be under definite interrelated control so that variation in temperature or in humidity will be at once compensated for without upsetting the desired relative balance through compensation for change in one or the other.

The apparatus in accordance with this invention will be found to be extremely simple and economic in construction and operation and will, with maximum efficiency, maintain any desired uniform conditions of temperature and humidity throughout an area, with the avoidance of areas of greater or less temperature or greater or less humidity than that desired, with avoidance of any condensation of moisture on walls or product and with maximum comfort to workers where the area is used for processing or manufacturing materials.

Economy in the operation of the apparatus will be promoted due to the fact that the controlled direction of circulation to and from the heating and humidifying means, which will be located in close association, will insure the utilization for the evaporation of water of heat input from the area, as from workers, lights, machinery, and the like, and such heat input will further promote efficiency in compensating for heat losses, as through walls.

Having now indicated, in a general way, the nature and purpose of this invention, I will proceed to a detailed description of a preferred embodiment of the invention from the apparatus standpoint in connection with the operation of which the method will be described, all with reference to the accompanying drawing, in which:

The single figure is a diagrammatic view of an area in which it is desired to provide uniform conditions of temperature and humidity, equipped with apparatus in accordance with this invention, a side view of the apparatus being shown partly in section.

In the drawing $a$ indicates an enclosed area, as a room, in which it is desired to maintain uniform conditions of temperature and humidity. The enclosed area $a$ may be adapted for the storage of material or for the processing or manufacture of material. Thus, the area $a$ may be adapted for the storage, processing or manufacture of tobacco, or other material susceptible to changes in temperature and humidity and demanding in storage or in processing uniform conditions of temperature and humidity.

Within the enclosed area $a$ is a casing $b$, provided at its rear with a screen or filter $x$ and a closure, as a door, $c$, hinged on its upper edge and arranged for adjustable opening through the medium of a bracket $d$ secured to the casing. If desired, or where conditions indicate, the closure $c$ may be hinged along its lower edge or along a side edge for opening downwardly or laterally instead of upwardly, as shown.

A conduit $e$, provided with a valve or damper $f$, leads from within the casing to without the storage space $a$ and permits admission of outside or fresh air to the casing when desired.

The forward end of the casing opposite to the screen or filter $x$ is provided with louvers $n$, which are adjustable for more or less opening or closing of the forward end of the casing by means of the lever $o$. The louvers will also control the direction of the discharge from the casing.

Within the casing $b$, adjacent its forward end is a coil $g$, connected with a source of heating fluid, as steam or hot water, through the conduit $h$ and connected with the conduit $i$ for the discharge of heating fluid. The coil $g$ may be connected with a source of cooling fluid, as cooled brine, or other cold fluid, instead of with a source of heating fluid. Again, if desired the coil $g$ may be connected with both a source of heating fluid and a source of cooling fluid through separate conduits controlled by suitable valves to enable either the heating fluid or the cooling fluid to pass through the coil.

Within the casing, behind the coil $g$ is a fan $m$, arranged to be driven by a motor $m'$, located within the casing and suitably supported from the bottom thereof. The fan $m$ will serve to draw air from the enclosed area $a$ into the casing through the screen or filter $x$ and discharge it from the casing through the coil $g$. Adjustment of the closure $c$ and of the louvers $n$ will determine the amount and direction of circulation of the air through the area $a$ and the casing $b$.

Immediately in front of the casing $b$ is positioned a water ejector comprising a water chamber $p$ and an air nozzle $q$. The water chamber is connected through a valved conduit $r$ with a source of water and the air nozzle is connected to a source of air under pressure through a conduit $s$ provided with a pressure gauge $t$. As will be obvious, when water is admitted to the water chamber $p$ and air is admitted through the conduit $s$, the water will be discharged or atomized into the stream of air passing out of the casing $b$.

The water ejector will be of such capacity and design as to deliver a spray of such volume and fine dispersion that all of the water sprayed will be evaporated by the air discharged through the heat interchanger by the fan $m$.

Desirably the amount of water sprayed into the air discharged from the heat interchanger may be so adjusted with reference to the volume and temperature of the air discharged so that not only will the air evaporate all of the water sprayed, but also the relative humidity of the air after passing the spray will not be above 90%.

Within the area $a$ are suitably located a thermostat $k$ and a humidostat $v$. The thermostat and humidostat will preferably be of the graduated action type. The humidostat and the thermostat, respectively, will be adapted to control air admitted to conduits $w$ and $l$ through a conduit $w$ leading from a source of air under pressure. The conduit $l$ connects with a valve in the heating or cooling fluid conduit $h$. The opening or degree of opening of valve $j$ is dependent upon the pressure of air in the conduit $l$.

The conduits through which air is supplied to the water ejector or atomizer is provided with a valve $u$, the opening or degree of opening of which is governed by the pressure of air in the conduit $w$ under control of the humidostat $v$. Conduit $h$ is provided with a bypass $n$ bypassing valve $j$ and with a valve $t$, the opening or degree of opening of which is controlled by the pressure of air in the conduit $w$ under the control of the humidostat $v$ and in turn the conduit $s$ is provided with a by-pass $y$ bypassing the valve $u$ and provided with a valve $z$, the opening or degree of opening depending upon the air pressure in the conduit $l$ under the control of the thermostat $k$.

It will now be noted that in the apparatus according to this invention, the direction of circulation of air in the area $a$ is controlled and may be varied at will by adjustment of the closure $c$ and the louvers $n$. Again, it will be noted that air passing through the casing $b$ under the influence of the fan $m$ is heated, or may be cooled, by passage through the coil $g$ and further that water is supplied to the air at a point immediately adjacent its exit from the coil $g$ in which it is heated.

Again, it will be noted that the humidostat $v$ and thermostat $k$ will be set for maintenance of the desired conditions of temperature and humidity in the area a and that on any variance of either the condition of temperature or humidity the thermostat or humidostat will operate to vary the amount of heating or cooling fluid passed through the coil g or the amount of air admitted to the water atomizer or ejector.

However, it will be particularly noted that where a variation in temperature occurs and causes, for example, the thermostat to operate to effect variation in the opening of the valve j for variation in the amount of heating fluid passed through the coil g, the thermostat will at the same time operate to effect a variation in the set of the valve z controlling the by-pass y in the conduit s through which air is supplied to the atomizer or ejector, with the result that necessary variation in the amount of water supplied to the air, with consideration for change in temperature of the air effected by the thermostat resulting from variation in the amount of heating fluid or cooling fluid passed through the coil g, will be effected simultaneously with variation in the amount of heating and cooling fluid. As a consequence, correction of variations in the relative humidity arising from variation in the temperature will not have to await reaction of the humidostat v.

The humidostat will operate in a similar manner to instantaneously vary the amount of heating or cooling fluid passed through the coil g to compensate for variation in temperature resulting from variation in the amount of water supplied to the air on reaction of the humidostat to correct change in relative humidity.

As a result of the interconnected control by the humidostat and the thermostat of the heating or cooling fluid and of the water, delay in compensating for changes in the humidity or temperature resultant from variation in the amount of heat or water supplied to the air, by operation of the thermostat or humidostat, will be confined to a minimum, and as a consequence maximum uniformity of temperature and relative humidity in the area a will be maintained.

As will be appreciated, the humidostat and thermostat and the balance controlled thereby will be initially set for the maintenance of desired conditions and the apparatus will be controlled for the maintenance thereof by the operation above described.

The admission of fresh air through the conduit e, under control of the valve f will be adjusted as may be dictated. However, as will be obvious, the amount of fresh air admitted may be very readily controlled by manipulation of valve f, or automatically, for example, through control of valve f by humidostat v. Thus, valve f may be actuated for the admission of fresh air into the circulation at a point adjacent to the heat interchanger coil g by the pressure of air in an extension 2 of the air conduit w under control of humidostat v.

Where the area a is of any very large extent or where desired or indicated, a plurality of units similar to that described in detail may be positioned generally in the area and may be controlled by the thermostat k and humidostat v, or by separate humidostats and thermostats.

As has, it is believed, been clearly indicated, the device above described may be used for cooling as well as for heating, it being only necessary to introduce into the coil g cooling fluid where cooling is desired and heating fluid where heating is desired. Humidification where required in either case will be effected by the discharge of water into the air discharged from casing b by means of the atomizer located immediately adjacent the discharge side of the coil g.

Thus, it will be clearly understood that where in the claims appended hereto reference is made to a heat interchanger cooling as well as heating means is contemplated.

As has been indicated, the apparatus in accordance with this invention will be found to be highly simple and economical in operation and, at the same time, provides both heating and humidifying elements in juxtaposition, means for the control of the direction of circulation through control of the direction of the intake and output from the casing b and interconnecting controls for the heating or cooling fluid and water introduction units. The apparatus will be found to be of the highest efficiency for the maintenance of control of uniform conditions throughout an area.

What I claim and desire to protect by Letters Patent is:

1. An air conditioning apparatus for the maintenance of a circulation of conditioned air within an enclosed space comprising, in combination, a heat interchanger located in the upper part of the enclosed space, means for circulating air in the enclosed space and through the heat interchanger, means, including a nozzle connected with a supply of air under pressure and associated with a nozzle connected with a water supply, adjacent the outlet from the heat interchanger for delivering a spray of water into the path of the air as it leaves the heat interchanger, means adjacent to the heat interchanger for controlling the direction of the flow of air from the heat interchanger into the enclosed space, means for the admission of air from outside of the enclosed space into the air in circulation therein at a point adjacent to the heat interchanger, and means remote from the heat interchanger and responsive to the humidity obtaining in the enclosed space for controlling said means for admitting air from outside the enclosed space, said spray being of such volume and dispersion that all the water of the spray will be evaporated by the air circulated through the heat interchanger.

2. An air conditioning apparatus for the maintenance of a circulation of conditioned air within an enclosed space comprising, in combination, a heat interchanger located in the upper portion of the enclosed space, means for the supply of a heating medium to the heat interchanger, means for circulating air in the enclosed space and through the heat interchanger, means adjacent to the heat interchanger for controlling the direction of the flow of air from the heat interchanger into the enclosed space, means, including a nozzle connected with a supply of air under pressure and associated with a nozzle connected with a water supply, adjacent the outlet from the heat interchanger for delivering a spray of water into the path of the air as it leaves the heat interchanger, means positioned in the enclosed space remote from the heat interchanger and in the direction of travel of the air and respectively responsive to temperature and humidity and respectively arranged for the control of the supply of heating medium to the heat interchanger and the supply of air to the means for delivering a spray of water into the path of the air as it leaves the heat interchanger.

RUSH D. TOUTON.